Aug. 20, 1935.    H. E. IVES    2,011,932
PROJECTION OF MOTION PICTURES
Filed Jan. 23, 1932    3 Sheets-Sheet 1

INVENTOR
H.E. IVES
BY
Stanley B. Kent.
ATTORNEY

Aug. 20, 1935.  H. E. IVES  2,011,932

PROJECTION OF MOTION PICTURES

Filed Jan. 23, 1932  3 Sheets-Sheet 2

INVENTOR
H. E. IVES
BY
Stanley B. Kent
ATTORNEY

Aug. 20, 1935.   H. E. IVES   2,011,932
PROJECTION OF MOTION PICTURES
Filed Jan. 23, 1932   3 Sheets-Sheet 3
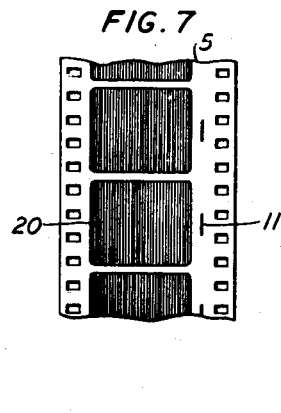
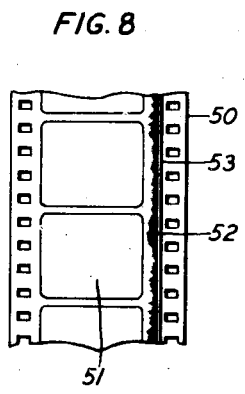
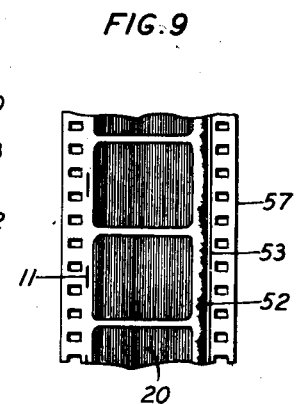
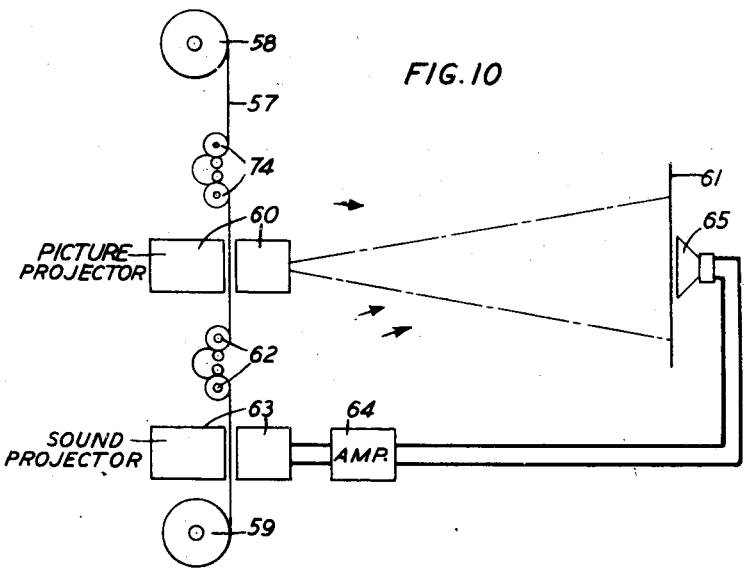
INVENTOR
H. E. IVES
BY
Stanley B. Kent
ATTORNEY Patented Aug. 20, 1935

2,011,932

UNITED STATES PATENT OFFICE 2,011,932

PROJECTION OF MOTION PICTURES

Herbert E. Ives, Montclair, N. J., assignor to Bell Telephone Laboratories, Incorporated, New York, N. Y., a corporation of New York Application January 23, 1932, Serial No. 588,327

7 Claims. (Cl. 88—16.2)

This invention relates to the projection of motion pictures and more particularly to the lateral control of moving picture film.

An object of the invention is to provide an improved arrangement for guiding a motion picture film to control transverse displacement.

A feature of the invention is a photoelectrically controlled guide roller positioned at the side of a moving picture film having sound or relief picture records or both recorded thereon, to control the lateral displacement of the film during projection, whereby a minimum amount of distortion is effected in reproducing the sound and projecting the relief pictures.

In one embodiment illustrative of the invention a moving picture film on which a series of stereoscopic strip images have been previously photographed, is projected upon the concave cylindrical grooved surface of a mirror-like reflecting type of screen for viewing the projected images as pictures in stereoscopic relief. For distortionless reproduction of the images as relief pictures upon the viewing screen, it is necessary that the projected strip images very accurately register on the concave grooves of the reflecting screen. This will not be effected if there is lateral displacement of the strip images constituting the picture frames with respect to the gate in the picture projector at the moment of projection. To control the lateral positioning of the film as it moves longitudinally through the picture projector, a guide roller is positioned on one side and in close contact with the film. This guide roller is photoelectrically controlled with reference to the images on the film. On the picture film and to one side of the series of strip images is photographed a guiding track or control record consisting of a series of short sections of an exceedingly fine narrow line. One of these narrow sections is photographed opposite and to the side of each of the relief picture images. An optical system is arranged to project a short and narrow beam of light through each of these sections of the control record, as the film moves intermittently, upon a light dividing device such as a bi-prism. The light dividing device causes part of the light which it receives to be sent to each of two photoelectric cells. The currents from the two photoelectric cells are amplified and control the movement of the guide roller by any suitable means. The apparatus is so adjusted that with the correct lateral positioning of the film with respect to the section of control record in the gate of the projector at that moment, equal amounts of light will be sent to each of the photoelectric cells. Under these conditions the amplified currents of the two photoelectric cells are equal. Since these two equal currents exert equal and opposite forces on the control mechanism there will be no reaction to the control system, that is, the film guide roller will not move. If, however, the film has any lateral displacement with respect to the guiding track, a greater amount of light will be sent to one photoelectric cell than to the other, disturbing the balance of the photoelectric cell currents. The amplified cell currents now being unequal will exert a greater current force in one direction than in the other on the control mechanism so that the guide roller will be pulled in such a direction as to move the film laterally until it again assumes its correct lateral position. When this is done the two cells are again equally illuminated, the balance of the two photoelectric currents restored, and the guide roller remains stationary in the new position.

With the arrangement described above a precise lateral control of the moving picture film is exercised so that the images projected from the film are accurately registered upon the viewing screen where they appear as pictures in relief. The relief picture film may also have a sound record and a continuous narrow line control record previously imprinted thereon by any suitable arrangement for reproducing the sound effects with a minimum amount of distortion. This is particularly applicable when the variable width type of sound record is used.

The invention will now be described more in detail having reference to the accompanying drawings.

Fig. 7 is a fragmentary showing of a motion picture film having a plurality of parallax panoramagram images, constituting frames, and an intermittent control record printed thereon.

Fig. 8 is a fragmentary showing of a motion picture film having a variable width sound track and a continuous control record printed thereon.

Fig. 9 is a fragmentary showing of a motion picture film having a plurality of parallax panoramagram images, an intermittent control record, a variable width sound track, and a continuous control record printed thereon.

Fig. 10 is a diagrammatic showing of one arrangement for projecting parallax panoramagram images and a sound record from the same motion picture film.

Figure 1:
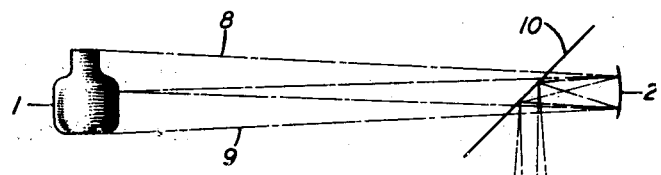
Fig. 1 is a diagrammatic showing of an arrangement for photographing stereoscopic parallax panoramagram images and a control record upon a motion picture film.
Figure 2:
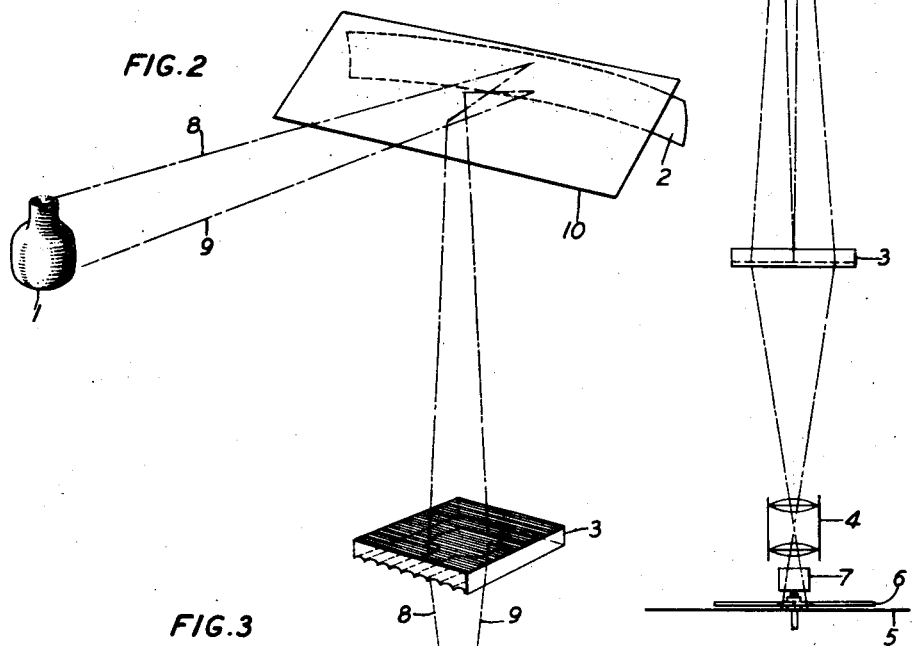
Fig. 2 is a perspective showing of the apparatus shown in Fig. 1.

Referring now to Figs. 1 and 2, a large diameter spherical strip mirror 2 is used to image the object 1 from a wide angle of view. This image is reflected to the concave cylindrical grooved grating 3 and from there it is photographed in reduced size by a high quality short focus photographic lens 4 upon the motion picture film 5 which is moved longitudinally in an intermittent manner. A rotating shutter 6 is employed to permit only one exposure of the motion picture film at the time. The operation of this taking apparatus is clearly understood by tracing the paths of the image forming light rays from the object 1 to the motion picture film 5. The boundary rays 8 and 9 emanating from the object 1 are transmitted through a semi-transparent reflector 10 which is positioned at 45° to the center axis of the object 1. The rays 8 and 9 after transmission through the semi-transparent reflector 10 strike the large diameter concave cylindrical strip mirror 2. The mirror 2 reflects these rays 8 and 9 back upon the semi-transparent reflector 10 which has a mirror-like reflecting surface upon the side toward the large concave mirror 2. Mirror 2 and semi-transparent reflector 10 are of the type disclosed in a paper by H. E. Ives, entitled "Parallax panoramagrams made with a large concave mirror", published in the November 1930 issue of the Journal of the Optical Society of America. The reflected rays 8 and 9 strike the mirror-like reflecting surface of the semi-transparent reflector 10 and are directed downward upon the transparent concave cylindrical grooved screen 3. The rays 8 and 9 as described represent only boundary rays in one plane from the boundaries of the object 1 and in between these rays are an infinity of intermediate similarly directed rays. All of these rays are received by the screen 3 and form on or near the grooved surface of this screen an image of the object 1 which image is in turn photographed upon the film 5 by means of the lens 4.

The parallax panoramagram pictures produced on the film 5 by the photographic process described above are of the stereoscopic type and are in their properties and utilization exactly like those produced with the taking apparatus disclosed in a patent of H. E. Ives, No. 1,960,011 patented May 22, 1934. The film 5, Figs. 1 and 2, moves longitudinally in an intermittent manner and the shutter 6 rotates in such a manner that a series of parallax panoramagram images are printed one at a time upon the film 5.

At the same time that the stereoscopic parallax panoramagram images are being printed on the film 5, another photographic process is taking place in which a series of short sections of a very fine narrow line are photographed upon the film in a longitudinal direction adjacent the series of parallax panoramagram images, each short section of the line being positioned opposite one of the parallax panoramagram images. The discontinuous line formed by this plurality of short sections serves later in the projecting apparatus as a guiding track or control record for controlling lateral displacement of the motion picture film upon which this record is photographed. The box 7 and lens 4 are maintained in a stationary position so that whether the film 5 in moving down has any lateral displacement or not the parallax panoramagram images 20 and the short sections of control record 11 will always have the same relative position with respect to each other on the film 5. The means for photographing this control record are shown diagrammatically by the element 7 in Figs. 1 and 2. The optical system which is inclosed in this box 7 is shown in detail in Fig. 3.

Figure 3:
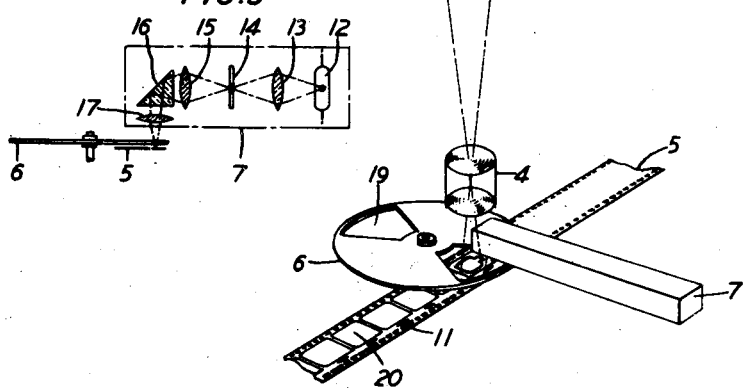
Fig. 3 is a detail showing of the optical system diagrammatically shown as the box 7 in Figs. 1 and 2.

Referring now to Fig. 3, the optical apparatus for photographing the control record on the motion picture film 5 comprises a short line source of light 12, a condensing lens 13 which gathers the light from source 12 and directs it to the diaphragm 14. A lens 15 directs the light from diaphragm 14 to a small prism 16 which bends the light rays at a suitable angle to strike the motion picture film 5. Another lens 17 focuses an image of the aperture in the diaphragm 14 upon the film 5. This optical system operates to form on the film 5 a short narrow section of a fine line 11 shown in Fig. 2. The length and width of the line 11 is determined by the size of the aperture in diaphragm 14. The shutter 6 interposed between the lens 17 and the film 5 has two apertures 19 shown in Fig. 2, which permit the short section 11 of the control record and the stereoscopic parallax panoramagram image 20 to be printed simultaneously on the motion picture film 5. The motion picture film 5 with its series of stereoscopic parallax panoramagram images 20 and its intermittent guiding track or control record 11 is developed to produce a positive which is projected with the apparatus shown in Fig. 4 to present with a minimum amount of distortion pictures visible in stereoscopic relief.

Figure 4:
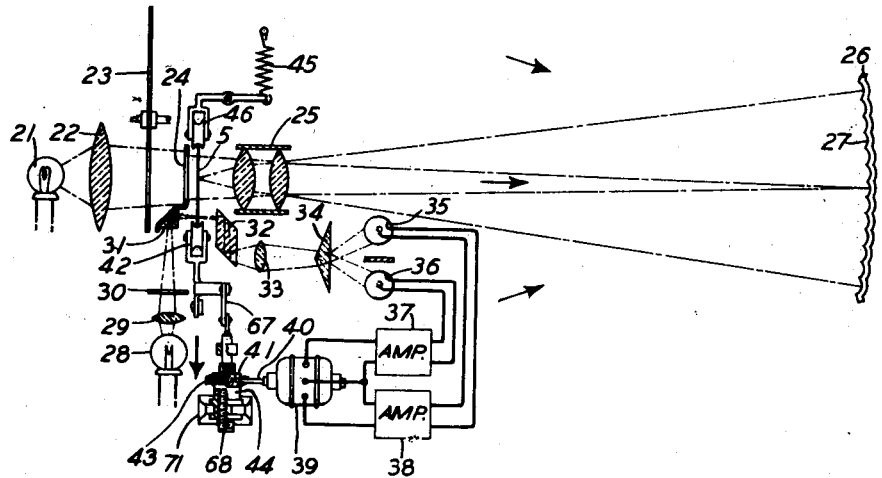
Fig. 4 is a diagrammatic showing of one arrangement for projecting parallax panoramagram images from a motion picture film, the transverse displacement of which is controlled by a photoelectrically controlled guide roller.

Referring now to Fig. 4 a light source 21, a condensing lens 22, a rotating shutter 23, a diaphragm 24, and an objective lens 25 are arranged to project one at a time the series of stereoscopic parallax panoramagram images printed on the positive motion picture film 5, upon the concave cylindrical grooved mirror-like reflecting surface 27 of the viewing screen 26. The motion picture film 5 is moved longitudinally in a well-known intermittent manner by any suitable type of mechanism. The diaphragm 24 confines the exposure light of the source 21 to just the area of the parallax panoramagram image on the picture film opposite the opening in the diaphragm. The opaque portion of the shutter 23 intercepts the exposure light during the time interval in which the motion picture film 5 is moving downward from one image to the next. When the film 5 is properly located with respect to the gate of the projector, the lens 25 projects the parallax panoramagram images upon the screen 26 in such a manner that the elemental strip images are accurately registered upon the elemental grooved surfaces of the curved mirror-like reflecting surface 27 of the screen 26. The projected images are viewed from the direction of the arrows as pictures visible in stereoscopic relief. This viewing screen 26 is of the type disclosed in a patent of H. E. Ives, No. 1,937,118 patented November 28, 1933.

In the projection of parallax panoramagram images, it is necessary to have accurate registration of the strip images of the parallax panoramagram upon the elemental surfaces of the viewing screen. If there is a slight lateral displacement of the motion picture film at the moment of projection of any image, this accurate registration is disturbed and distortion of the image will be noticeable when viewed upon the viewing screen. To minimize distortion of this type, there is employed according to this invention, a photoelectrically controlled guide roller which insures accurate lateral control of the motion picture film at the moment of projection. This motion picture film guiding apparatus is also illustrated in Fig. 4.

Referring again to Fig. 4 a light source 28, a lens 29, a diaphragm 30, and a small prism 31 are arranged to project a beam of light through the short narrow section of control record opposite the parallax panoramagram image, on the film 5 which is being projected at that moment. The light rays after passing through this short, narrow line are received upon a prism 32 which serves to bend the rays down and out of the way of the picture image optical system. The light rays leaving the prism 32 are focused by lens 33 to form an image of the short narrow section of control record of the film 5, through which they were transmitted upon the bi-prism 34 which divides the image forming bundle of rays and sends part of it to each of the two photoelectric cells 35 and 36. These light rays cause photoelectric currents to be generated in each of the photoelectric cells 35 and 36. These currents are conducted over separate lines, as shown, to separate amplifiers 37 and 38 where they are separately amplified. These two amplifiers are connected to a motor 39 which is operated by these amplified currents. This motor is of the type such that its armature may revolve in either a clockwise or a counter-clockwise direction, depending upon the respective amounts of current supplied to the motor from the amplifiers 37 and 38. When the currents in the two amplifiers are equal the armature of the motor 39 does not move in either direction.

During projection of the relief picture images upon the screen 26, the film 5 moves down through the projector at a rapid rate. If any of the parallax panoramagram images and their corresponding control records on the film 5 are not accurately positioned with respect to the gate of the projector at the moment of projection, the film 5 will be automatically laterally shifted by the photoelectrically controlled guide roller 42 in such a direction that the image being projected will be accurately positioned. For purposes of illustration, the operation of this device with two different conditions of the film 5 will now be described. The first condition is when the image, on the motion picture film 5, being projected is in the correct lateral position with respect to the gate of the projector. When this condition prevails the bundle of light rays coming from the lens 33 is focused over a small area in the center portion of the prism 34 and on account of this centering the bundle of light rays is divided into equal amounts which are directed to the photoelectric cells 35 and 36 respectively by the well-known action of a prism, such as prism 34. The equal amounts of light impinging upon the photoelectric cells 35 and 36 respectively cause equal photoelectric currents to be generated in these two cells. These two photoelectric currents are amplified equally by amplifiers 37 and 38 respectively, the output currents of which are connected to the motor 39. Since these amplified currents are of equal amount and are connected in opposing relationship to the motor 39, the armature of this motor will not move. Accordingly, the guide roller 42 and all of its associated parts will remain stationary so that the film 5 is not moved in either direction laterally. Under the second condition of the film 5, let us assume that the relief picture image and its associated control record being projected are displaced laterally away from the guide roller 42. In this case, light from the source 28 directed by the lens 29 and diaphragm 30 and prism 31 will still be transmitted through the short section of narrow line control record on the film 5 in the same amount as when the record and its associated relief picture image were in the correct lateral position. This bundle of light rays, however, will be displaced laterally in the opposite direction to which the relief image is displaced, in accordance with the optical lever principle effected by the lens 33 so that the image forming light rays from the lens 33 will not be centered over the same small area of the prism 34 as formerly but will be displaced from the center of this prism in the direction of the photoelectric cell 36, that is, that side of the prism will receive the larger amount of the light rays. Under these conditions, the prism 34 will direct a greater amount of the rays to the photoelectric cell 35 than to the photoelectric cell 36, due to the optical lever action of the prism 34 causing a crossing of the incident rays as shown, which will in turn cause a larger photoelectric current to be generated in the cell 35 than is generated in the cell 36. Accordingly, the amplifier 38 receiving a larger current from the cell 35 than the amplifier 37 receives from the cell 36, will have a larger output current which, in turn, will cause the armature of motor 39 to revolve in a counter-clockwise direction. This will cause the shaft 40 of the motor 39 to revolve also in a counter-clockwise direction. This shaft 40 carries a worm gear 41 which drives a helical gear 43. Helical gear 43 is integral with barrel 44 which is supported by bearing 71 and is internally threaded to fit a lead screw 68. This screw 68 terminates in a linkage 67 which in turn moves the guide roller 42. With the shaft 40 revolving in a counter-clockwise direction, the gears 41 and 43 cause rotation of the barrel 44 which operates upon the screw 68 causing it to move in such a direction that the linkage 67 and the guide roller 42 are withdrawn from the film 5 in the direction of the arrow. Since now no pressure is being applied to the film 5 by the guide roller 42, the guide roller 46 under tension of the spring 45 will now move the film 5 transversely toward the guide roller 42 until it assumes its correct lateral position with respect to the gate of the projector. When this correct position is assumed the bundle of light rays passing through the short narrow section of the control record on the film 5 will be focused by the lens 33 upon the center area of the prism 34 which will again cause equal amounts of light to be sent to the photoelectric cells 35 and 36 respectively. The output currents of these cells, as well as the two amplifiers 37 and 38 will again be equal and these equal currents applied to the motor 39 in opposing relationship will stop the armature of the motor 39 from revolving. The shaft 40 will likewise cease revolving and the screw 68 will hold the linkage 67 and the guide roller 42 in the position last assumed.

If any relief picture image and its associated control record on the film 5 should be displaced laterally toward the guide roller 42 and consequently not in accurate alignment with respect to the gate of the projector during projection, the operation of the apparatus will be just the opposite of that described above in the preceding paragraph.

Figure 5:
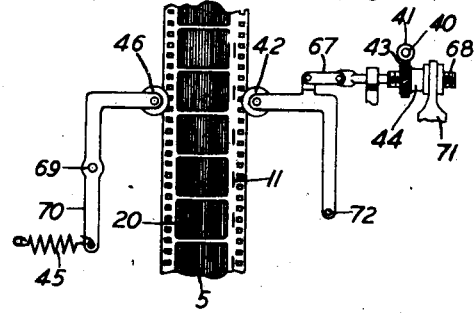
Fig. 5 is a detail showing of a stereoscopic parallax panoramagram motion picture film and guide rollers to control the transverse displacement of the film.

Fig. 5 is a detail showing of a slightly modified arrangement of the film and guide roller used in Fig. 4. The photoelectrically controlled guide roller is in the form of a grooved wheel 42 which is kept in close contact with the edge of the film 5 by means of the linkage 67 pivoted at the point 72. The roller 46 is connected to the L-shaped member 70 pivoted at point 69, and is held against the film 5 under the tension of the spring 45. This roller is to insure that the film 5 is held firmly against the guide roller 42.

The section of motion picture film 5 shown in front view in Fig. 7 is like that used in the projection apparatus of Fig. 4 described above. This figure shows the relation between the parallax panoramagram images 20 and the intermittent control record 11.

The motion picture film 50 shown in front view in Fig. 8 has a series of ordinary type motion picture images 51, and to one side of the images, a variable width sound track 52 and a control record in the form of a continuous line 53. Such a film as shown in Fig. 8 is projected in the sound projection apparatus illustrated in Fig. 6, to reproduce sound effects with a minimum amount of distortion.

Figure 6:
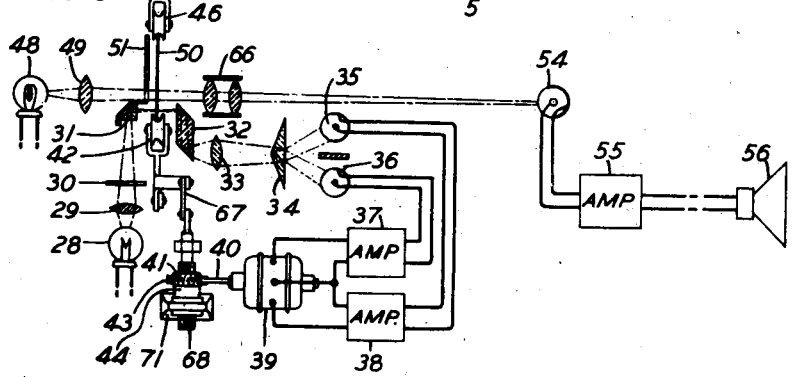
Fig. 6 is a diagrammatic showing of one arrangement for projecting a sound record from a sound picture film, the transverse displacement of which is controlled by a photoelectrically controlled guide roller.

Referring now to Fig. 6, a light source 48, a lens 49, a diaphragm 51 and an objective lens 66, are arranged to project a beam of light through sound record 52, on the film 50, upon a photoelectric cell 54, the current output of which is amplified by a well-known type of amplifier 55, whose output in turn is used to operate the speaker 56 for reproducing the sound record printed on the motion picture film 50. Lateral displacement of the sound record and its associated control record on this film is controlled by the photoelectrically controlled guide roller 42 in the same manner described above for controlling the lateral displacement of the relief picture images on the motion picture film 5 in Fig. 4, with one exception. This exception is that, in the operation of the sound projection apparatus the variable width sound record is exposed continuously instead of intermittently, as the parallax panoramagram image motion picture film 5 of Fig. 4 is exposed, and consequently the control record 53 on the film 50 is continuously exposed instead of intermittently exposed like the control record 11 on film 5 in Fig. 4.

A combination of the two types of film shown in Figs. 7 and 8 is illustrated in Fig. 9.

Referring now to Fig. 9 a motion picture film 57 comprises a series of parallax panoramagram images 20, an intermittent control record 11 for insuring the correct lateral position of the images during projection, a variable width sound track 52, and a continuous control record 53 for insuring the correct lateral position of the sound record during projection. For projection of the type of film 57 the apparatus shown diagrammatically in Fig. 10 is used.

Referring now to Fig. 10 the film 57 is fed downward from reel 58 over rollers 74 to the relief picture projecting apparatus 60 which might be, for example, the projecting apparatus shown in Fig. 4. The motion picture film 57 at this stage is moving in an intermittent manner and the parallax panoramagram images on the film are projected upon the relief picture screen 61 from which they are viewed from the directions indicated by the arrows as pictures in stereoscopic relief. The film 57 continues to move downward and after passing over rollers 62 moves no longer in an intermittent manner, but in a continuous one. The sound record 52 on the film 57 is projected by the sound projection apparatus 63 which might be of the type shown in Fig. 6. The currents generated in the photoelectric cell of the sound apparatus are amplified by the amplifier 64 and the amplified currents used to operate the speaker 65 to reproduce the sound effects recorded on the film 57. The film is finally rewound upon the take-up reel 59. In both the relief picture and the sound projection apparatus of Fig. 10 photoelectrically controlled guide rollers shown in Figs. 4 and 6 and their associated mechanisms are used to control the lateral displacement of the relief picture images and sound record printed on the film so that reproduction of relief pictures and sound effects with minimum distortion is obtained.

This invention is just as applicable to pseudoscopic parallax panoramagram pictures as it is to stereoscopic and the necessary modifications to use the former as well as their combination with sound effects, all come within the purview of this invention, the scope of which is limited only by the following claims.

What is claimed is:

1. In apparatus for producing distortionless relief pictures, a motion picture film having a control record imprinted thereon, means for controlling the lateral displacement of said motion picture film, said means comprising a light source and lens system for projecting a narrow beam of light through said control record, two photoelectric cells, a light dividing device for directing to each of said photoelectric cells a part of the light projected through said control record, two amplifiers connected separately to said photoelectric cells for receiving and amplifying the output currents of each of said cells, respectively, a reversible motor connected across the output of said amplifiers, a movable member terminating in a guide roller and connected to the shaft of said motor through the intermediary of meshing gears, said guide roller being positioned in close contact with the edge of said motion picture film and causing the motion picture film to move transversely in one direction or the other in accordance with the direction of rotation of the shaft of said motor which in turn is determined by the varying lateral position of said control record and the unequal output currents of said photoelectric cells.

2. In apparatus for producing distortionless sound effects, a film having recorded thereon a sound record and a control record, said control record comprising a continuous longitudinal narrow-line trace, means for projecting a beam of light through said sound record, means for receiving and converting said projected light beam into an electric current, means for amplifying said current, and means for converting said amplified current into audible signals, a guide roller positioned in contact with the edge of said film, and means for causing said guide roller to move in the plane of said film to move the said film transversely in accordance with the lateral position of said control record.

3. In apparatus for controlling the lateral displacement of a picture film, means for moving said film longitudinally, a plurality of light sensitive cells, means for projecting varying amounts of light through said film upon said cells in accordance with the transverse position of a control record on said film, means for amplifying the varying currents generated in said cells, a two-directional motor whose direction of rotation changes in accordance with the varying amplified photoelectric currents, a guide roller positioned in close contact with said film and adapted to move said film transversely through the intermediary of shafts and meshing gears, from left to right or vice versa in accordance with the direction of rotation of said motor.

4. In projection apparatus, light projecting means having a gate, an elongated film strip carrying both a record requiring accurate registration with said gate during projection and a control record uniformly transversely positioned on said film with respect to said projection record, means to move said projection record past said gate, means to illuminate said control record, and means utilizing the light passing through said control record to properly transversely position said film and consequently said projection record with respect to said gate, said last means comprising guiding means in contact with said film and means to move said guiding means parallel to the plane of the film.

5. In projection apparatus, light projecting means having a gate, an elongated film strip carrying both a record requiring accurate registration with said gate during projection and a control record uniformly transversely positioned on said film with respect to said projection record, means to move said projection record past said gate, means to illuminate said control record, a pair of light sensitive devices, means to control the relative illumination of said devices by light passing through said control record in accordance with the transverse position of said film, and means controlled by said light sensitive devices to move said film transversely to a predetermined position in which said projection record accurately registers with said gate, when for any reason it is moved from said position.

6. In film utilizing apparatus, a gate, a film strip, means to move said film longitudinally past said gate, and photoelectrically controlled means to position said film transversely with respect to said gate in accordance with the transverse position of a longitudinal trace on said film, said last means comprising a guide roller in contact with the edge of the film opposite the gate, means to direct a beam of light to the trace at a position opposite the gate, and means to move said guide roller parallel to the plane of the film in accordance with changes in the light beam produced by said trace.

7. The combination with a transparency having thereon a series of position controlling markings and a series of markings capable of modulating a light beam, portions of said first series being equally spaced from respective portions of said second series, two light sensitive electric elements, means for passing two stationary beams of light through said transparency so that a portion of said second series of markings will lie in one beam and the corresponding portion of said first series of markings will lie in the other beam and cause equal amounts of light therefrom to reach said light sensitive elements, means for moving said transparency so that said position controlling markings will pass in succession through said second beam, means gripping a portion of said transparency for moving it transversely to said first mentioned movement, and means under control of said light sensitive elements for moving said gripping means in a direction to establish equality of currents in said light sensitive elements whenever said transparency moves in a direction to cause said currents to be unequal.

HERBERT E. IVES.